(12) United States Patent
Hook

(10) Patent No.: US 7,131,549 B2
(45) Date of Patent: Nov. 7, 2006

(54) DOUBLE SIDED GRILL WITH AUTOMATED CONTROL INCLUDING LOCALIZED PROMPTING AND CONFIRMATION OF MANUAL OPERATIONS

(75) Inventor: Roy E. Hook, Powell, OH (US)

(73) Assignee: Oldemark LLC, Burlington, VT (US)

( * ) Notice: Subject to any disclaimer, the term of this patent is extended or adjusted under 35 U.S.C. 154(b) by 269 days.

(21) Appl. No.: 10/687,791

(22) Filed: Oct. 17, 2003

(65) Prior Publication Data

US 2004/0129693 A1 Jul. 8, 2004

Related U.S. Application Data

(60) Provisional application No. 60/419,448, filed on Oct. 18, 2002.

(51) Int. Cl.
*H05B 1/02* (2006.01)
(52) U.S. Cl. ............ 215/494; 219/506; 219/486; 219/483
(58) Field of Classification Search ........... 219/494, 219/497, 499, 501, 505, 483–486; 307/38–41
See application file for complete search history.

(56) References Cited

U.S. PATENT DOCUMENTS

| | | | | |
|---|---|---|---|---|
| 5,272,300 A | * | 12/1993 | Edamura | 219/702 |
| 5,934,182 A | | 8/1999 | Harter et al. | |
| 6,026,736 A | * | 2/2000 | Turner | 99/349 |
| 6,079,321 A | | 6/2000 | Harter et al. | |

* cited by examiner

*Primary Examiner*—Mark Paschall
(74) *Attorney, Agent, or Firm*—Frank H. Foster; Kremblas, Foster, Phillips & Pollick

(57) ABSTRACT

Food heating operations and manual manipulations associated with a cooking appliance are controlled by a computer system connected to displays and input switches which arranged in physically associated pairs, each pair having a display and a switch and the pairs are physically located at diverse locations on the grill in proximity to the location of the performance of the manual operations they signal. Other inputs provide data inputs for appliance attributes, food heating attributes and mode selections. Control of cooking and staging occurs and the work product is tracked beginning from entry of raw food work product onto the grill all the way through removal of the work product for assembly into a sandwich or diversion to holding for subsequent chili preparation.

22 Claims, 11 Drawing Sheets

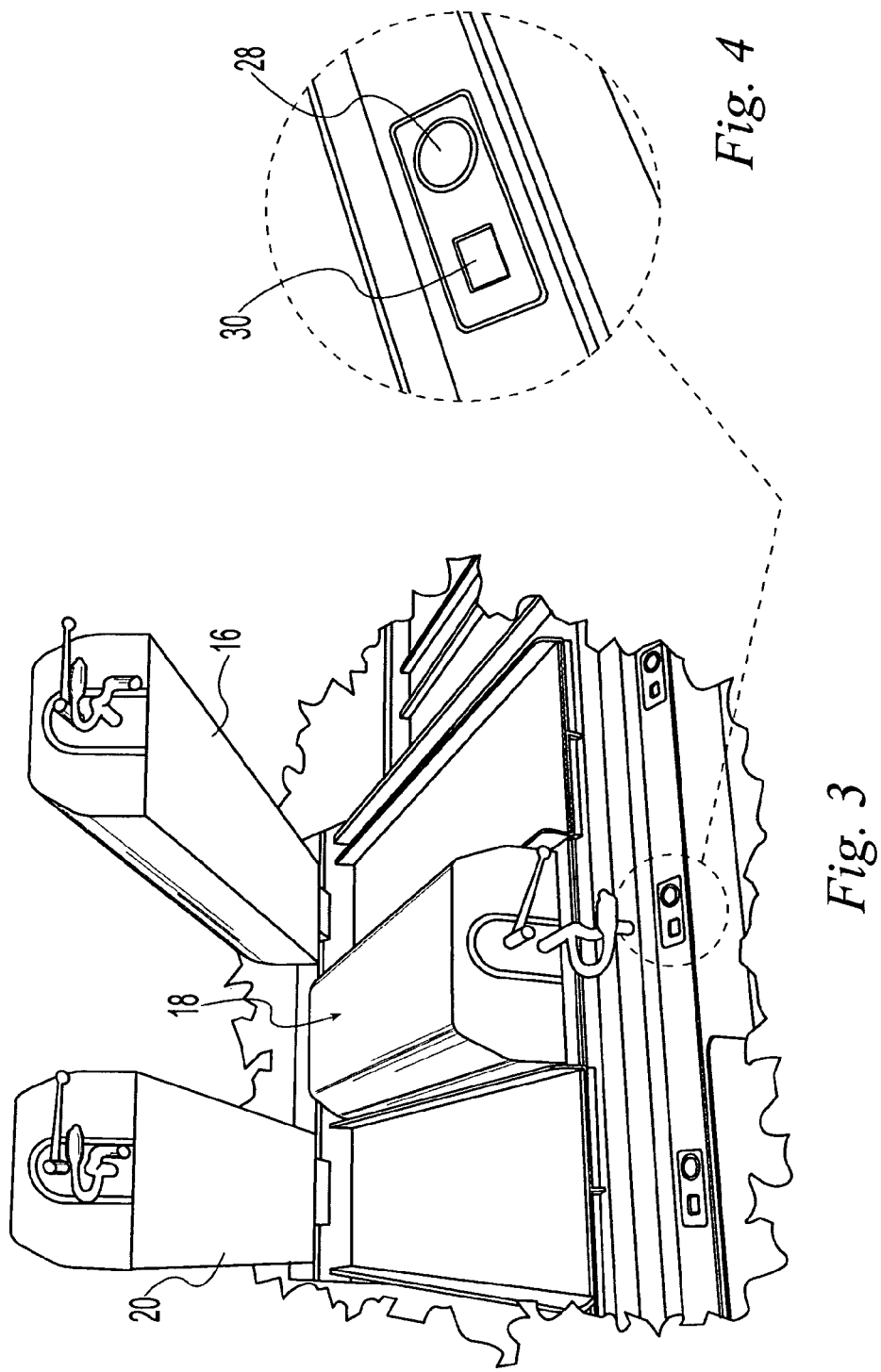

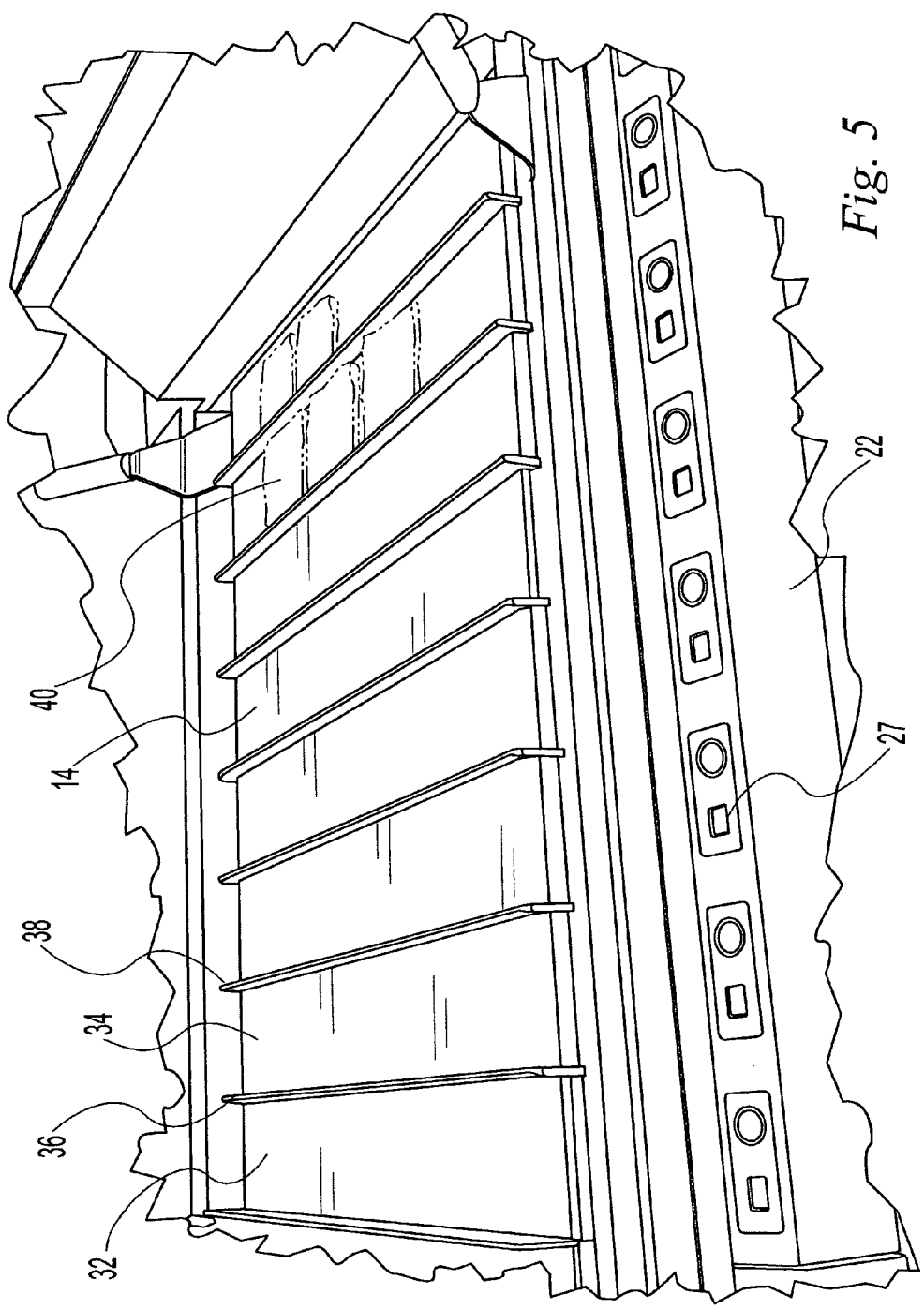

Cooking Platen Display Graphics - Normal Cook Cycle
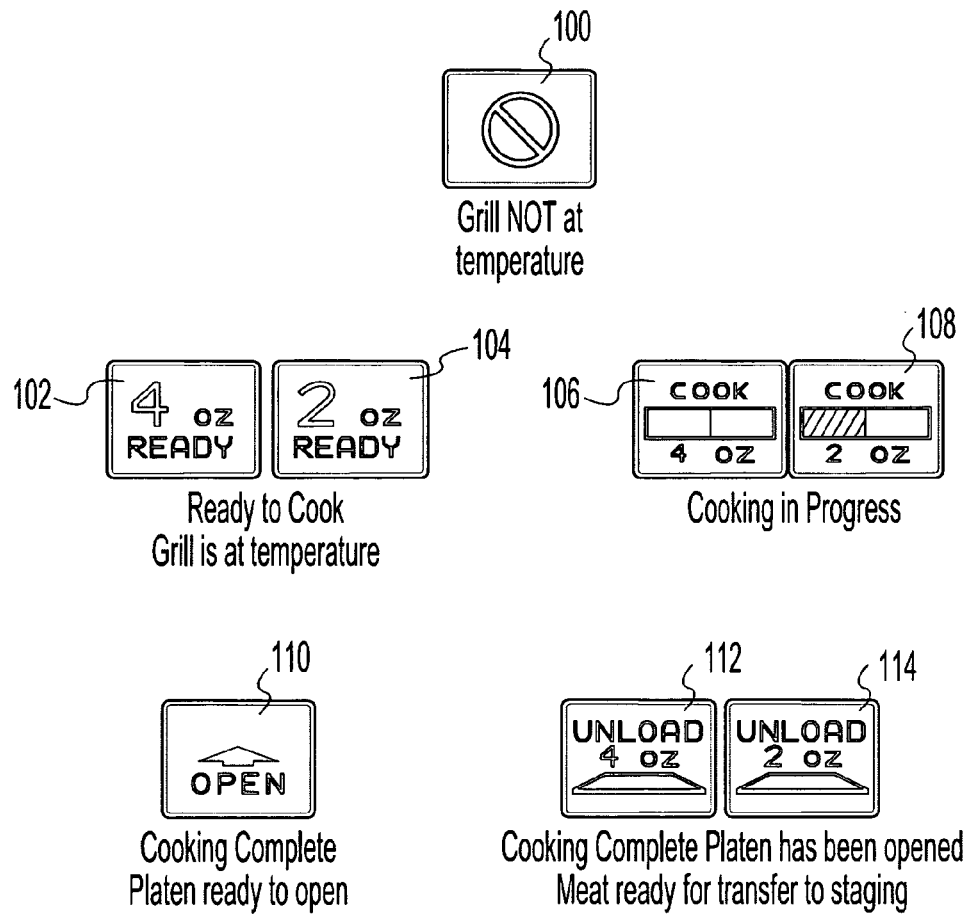
Alarm Modes
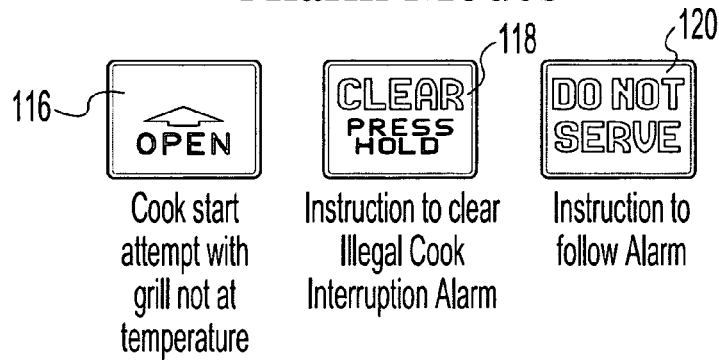
*Fig. 10*

*Fig. 11*
Staging Area Display Graphics
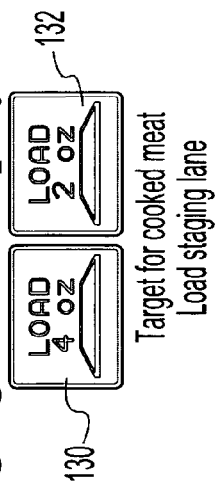
Target for cooked meat
Load staging lane
Backup Serving Lanes
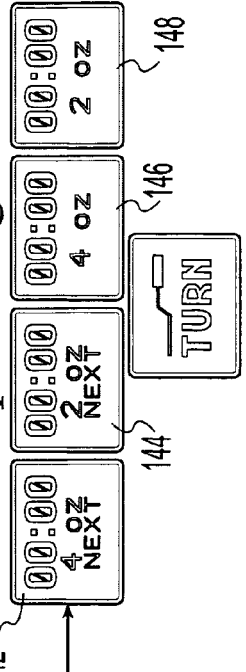
Staging Lane Cleared
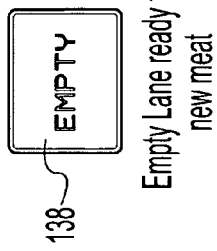
Empty Lane ready for new meat
Active Serving Lanes
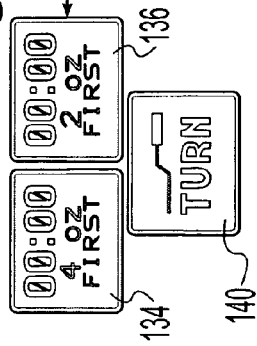
Staging Lanes with time remaining display
Turn row indicator
Staging Time Expired
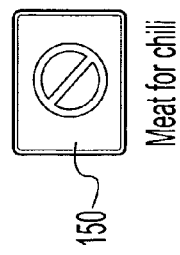
Meat for chili

DOUBLE SIDED GRILL WITH AUTOMATED CONTROL INCLUDING LOCALIZED PROMPTING AND CONFIRMATION OF MANUAL OPERATIONS

(b) CROSS-REFERENCES TO RELATED APPLICATIONS

This application claims the benefit of U.S. Provisional Application No. 60/419,448 filed Oct. 18, 2002.

(c) STATEMENT REGARDING FEDERALLY-SPONSORED RESEARCH AND DEVELOPMENT (Not Applicable)

(d) REFERENCE TO AN APPENDIX"

(Not Applicable)

(e) BACKGROUND OF THE INVENTION

1. Field of the Invention

This invention relates generally to food cooking appliances and more particularly to an automated food cooking appliance which is most advantageous for assisting in the preparation of safe, uniform and high quality food products in high volume restaurants although using moderately trained operators.

2. Description of the Related Art

Cooking appliances have developed over many millennia for assisting the cooking of food products for human consumption. In the last century, automated features have been added, particularly for controlling the cooking temperature and for signaling the cooking time. Cooking temperatures have long been controlled by closed loop feedback control systems which include a temperature sensor and a relay or a solenoid controlled valve for controlling electric or gas fueled heaters. Feedback control systems are commonly implemented in both analog and digital circuits. The development of the electronic computer and microcontrollers, which are special purpose computers for controlling a particular apparatus, has made possible the implementation of control systems under the control of computer software.

The past half century has seen the development of numerous chains of high volume, rapid service, specialty restaurants. Such restaurants are characterized by a specialized menu of prepared food products having a quality which is uniform throughout the chain. This uniformity of quality reassures customers that they will receive the same high quality products at any restaurant in the chain. Reputable restaurants are also quite concerned about the maintenance of safe health standards because even a single problem can cause extensive damage to their reputation.

In order to make the food products available at an affordable price, such restaurants ordinarily employ large numbers of employees who are not highly trained in food preparation. Therefore, in order to maintain high standards of safety, quality and uniformity, it is desirable that the cooking procedures be closely controlled by the responsible, central authority, typically a franchisor. Maintenance of food sanitation and safety and compliance with health regulations are important reasons that cooking and other aspects of food preparation be controlled by the franchisor.

One way of controlling the food preparation procedures so they are uniformly practiced in the best manner is to automate the procedures. Consequently, the prior art has seen temperature controls and the use of independent timer systems which signal the elapse of a timing cycle for a cooking procedure, such as the frying of french fries. However, the audible signals or the computer screen displays generated by the completion of such a timing cycle are typically not closely physically associated with the equipment upon which the cooking procedure is being performed. For example, a computer display may be located above or beside an appliance and often above a group of appliances.

A grill is one of the most common cooking appliances, particularly in restaurants of the type described. A grill is often the cooking appliance upon which the most featured product of the restaurant is prepared, such as a hamburger, for a restaurant known for its unique or featured hamburgers. Modem grills have automated temperature controls and are also used with independent timing and signaling systems. Grills are also known which, after the operator places food products on the grill and depresses a button, the grill automatically lowers an upper platen upon the food products, initiates a timing cycle and automatically raises the upper platen when a stored cooking time has elapsed. From a control perspective, such a system is not unlike a conventional electric toaster into which a piece of bread is placed, an actuating handle is depressed to lower the bread into the cooking zone and, after a timing interval, the bread is automatically raised to a position out of the cooking zone for removal by the operator. These systems control a single food heating operation at a single location on the grill.

Food products heated on grills, however, often require a series of related heating and manipulative operations which must be coordinated, each with its own timing requirements and therefore its own opportunities for error. For example, after a food product is properly cooked, if it is not served immediately, it must be held on the grill so that it will remain hot and moist. This holding operation is also referring to as staging. Because each customer expects the rapid service for which the restaurant is known, and because there are large fluctuations in the rate of customer orders during a typical day, the cooking process often must be initiated in advance of customer orders and the rate of serving varies and can be unpredictable. Therefore, a major part of the grill operation is commonly devoted to the proper holding of the cooked food products. However, in order to maintain quality and freshness, the held food products must not be held too long and, when the holding time standard of the operator or franchiser has been exceeded, the food products must be diverted to other uses or discarded.

Prior art systems do not have control systems which are integrated with multiple zones on the grill and are capable of controlling the entire series of food product heating and physical manipulation from placement of the food product on the grill through its removal from the grill. As a result, either at least some of the operations on the grill are left entirely to the knowledge of and timely action by the operator, or, if a separate timing and display system is used, its signals and displays must be interpreted by the operator requiring the operator to know the place the operations are to be performed. Additionally, after a timer has signaled the elapse of a time interval, there is commonly no way to signal that a manual operation has actually been performed by the employee. Therefore, if an employee fails to take an action, fails to take the action at the proper location or fails to take the action within the appropriate time after the action is supposed to be performed, food product quality and possibly food safety can be reduced. Thus, with prior art systems there are excessive opportunities for human errors and resulting departures from the preparation of food products of optimum quality and safety.

It is therefore an object and feature of the invention to provide a grill which not only automatically controls the grill itself, but also controls the interaction of the grill with the operator who performs manual operations on the food products on the grill.

A further object and feature of the invention is to provide a grill control system which has a computer control which controls the interaction of the human operator with the grill to establish control over not only the entire cooking process but also any subsequent holding, serving and diversion to chili operations which may be associated, for example, with the preparation of hamburgers. The control and the cooking equipment are integrated to control performance of the cooking process. Control of cooking and holding (staging) occurs and the work product is tracked beginning from entry of raw food work product onto the grill all the way through removal of the work product for assembly into a sandwich or diversion to holding for subsequent chili preparation.

(f) BRIEF SUMMARY OF THE INVENTION

Food heating operations and manual manipulations associated with a cooking appliance, having a plurality of heated zones, are controlled by storing one or more selectable time intervals, associated with the food products to be heated and the operations to be performed, at a each zone. The stored time interval is the time desired for performing a food workpiece heating operation at the associated zone upon a particular food workpiece after which a manual food workpiece manipulation needs to be performed. The commencement of a heating operation at a zone is detected and a timing cycle for the zone is initiated when the heating operation commences. The elapse of the stored time interval associated with the zone is visually signaled at a display which is physically associated with the zone. A confirmation signal is input from a manually operable switch physically associated with the zone so that the operator can actuate the switch when the signaled manual workpiece operation for that zone has been performed. These operations may include moving food workpieces from a cooking zone to a staging zone, turning the food workpieces while in the staging zone, removing the food workpieces for assembly into a sandwich, and removing the food workpieces for retention for later preparation of chili.

The above is accomplished with a control system connected to and for controlling a cooking appliance having a plurality of heated zones. The control system has a microcontroller computer system under control of a program controlling cooking times, for generating signals indicating the need for manual operations by an operator and for processing input signals from the operator and from sensors on the grill. A plurality of sensors, including temperature sensors for detecting a temperature of each zone, are connected to input temperature signals to the computer system. Preferably, there are also sensors for detecting other appliance states, such as the position of movable parts. A plurality of displays are each connected to receive output signals from the computer system. At least some of these displays are each mounted in physical association with a zone for signaling a zone condition and for signaling manual operations needed for its associated zone. A plurality of manually actuable, input confirmation switches are each connected to input a signal to the computer system. Each manual input switch is mounted in physical association to a zone for manual confirmation of the completion of a manual operation signaled by a display for its associated zone. Most advantageously, the displays and input switches are arranged in physically associated pairs, each pair having a display and a switch and the pairs are physically located at diverse locations on the grill in proximity to the location of the performance of the manual operations they signal. An audible alarm is connected to receive output signals from the computer system for signaling to an operator the need to perform a manual operation.

(g) BRIEF DESCRIPTION OF THE SEVERAL VIEWS OF THE DRAWINGS

FIG. 3 is a view in front perspective of the cooking area and upper cooking platens of the grill of FIG. 1.

FIG. 4 is a detailed view in perspective of a manually actuated, confirmation switch and a user interface display which are associated as a pair, similar associated pairs being replicated at multiple locations on the embodiment illustrated in FIG. 1 in physical association with cooking zones to which their inputs and outputs pertain.

FIG. 5 is a view in frontal perspective of the staging area of the grill illustrated in FIG. 1.

FIG. 10 is a table of examples of display indicia for the displays which are physically associated with the cooking zones of a cooking appliance embodying the invention.

FIG. 11 is a table of examples of display indicia for the displays which are physically associated with staging zones of a cooking appliance embodying the invention.

Figure 1:
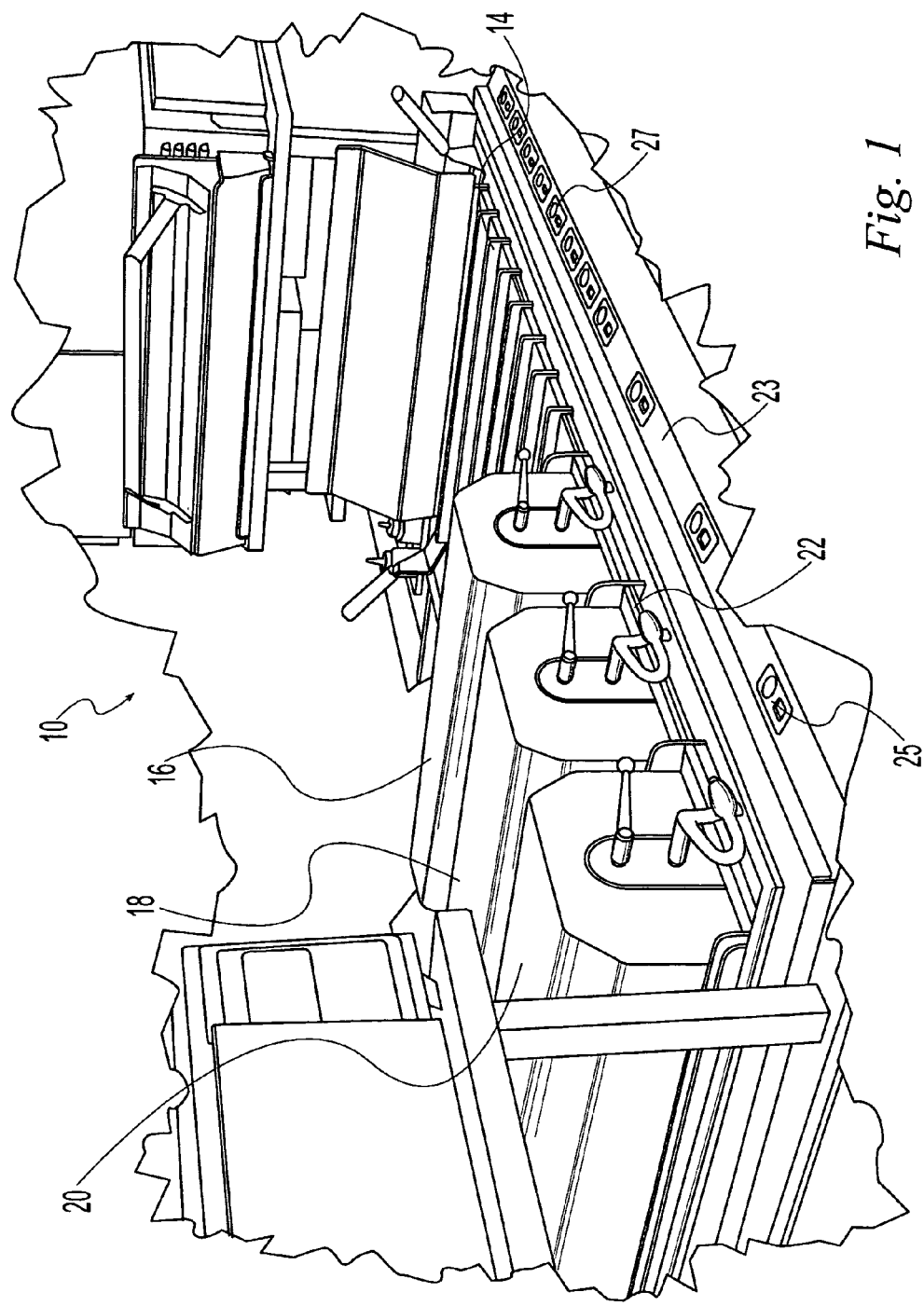
FIG. 1 is a view in frontal perspective of a grill embodying the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other circuit elements where such connection is recognized as being equivalent by those skilled in the art. In addition, many circuits are illustrated which are of a type which perform well known operations on electronic signals. Those skilled in the art will recognize that there are many, and in the future may be additional, alternative circuits which are recognized as equivalent because they provide the same operations on the signals.

(h) DETAILED DESCRIPTION OF THE INVENTION

Structural Features of the Preferred Cooking Appliance

Figure 2:
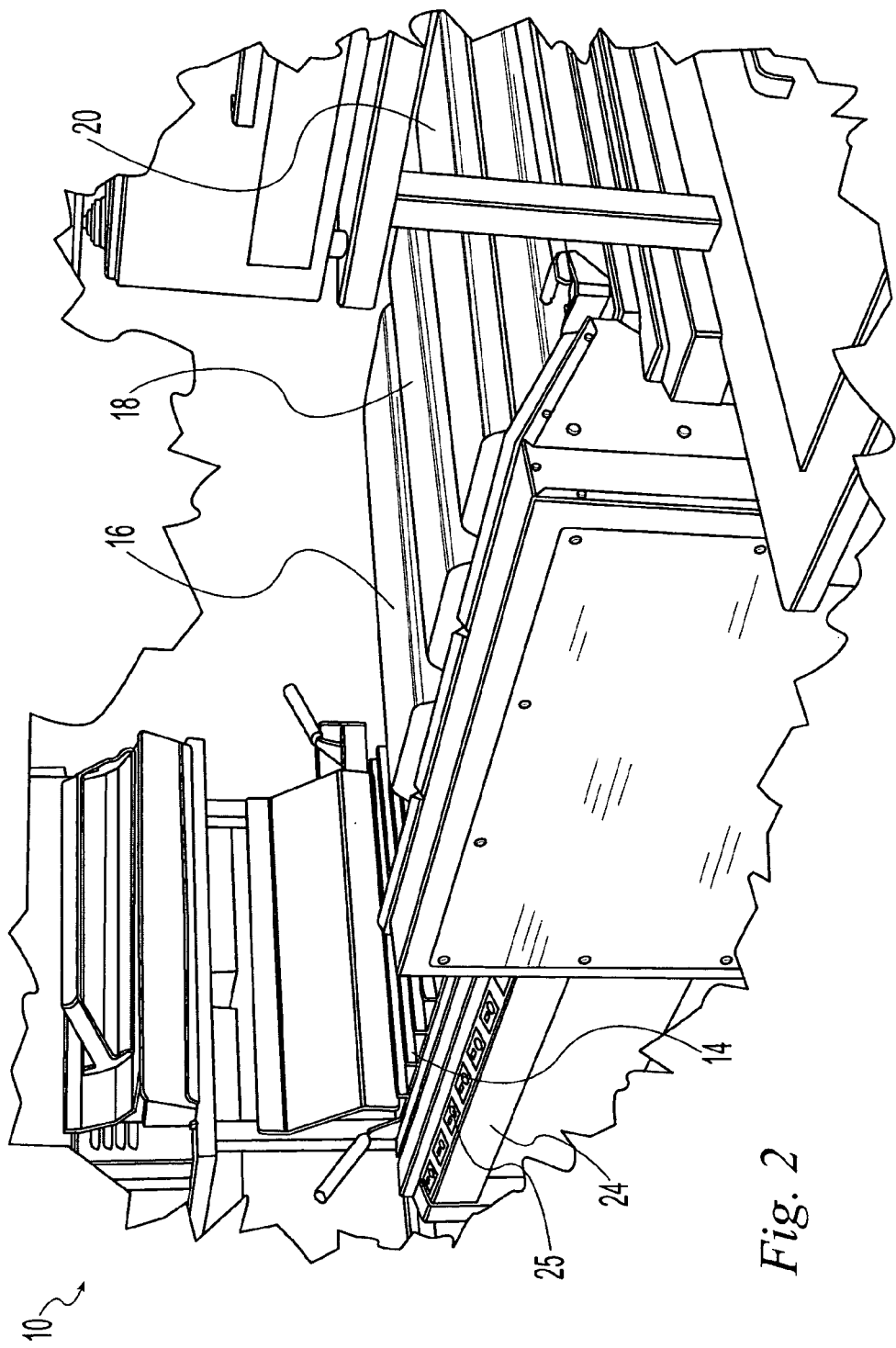
FIG. 2 is a view in rear perspective of the grill of FIG. 1.
Figure 6:
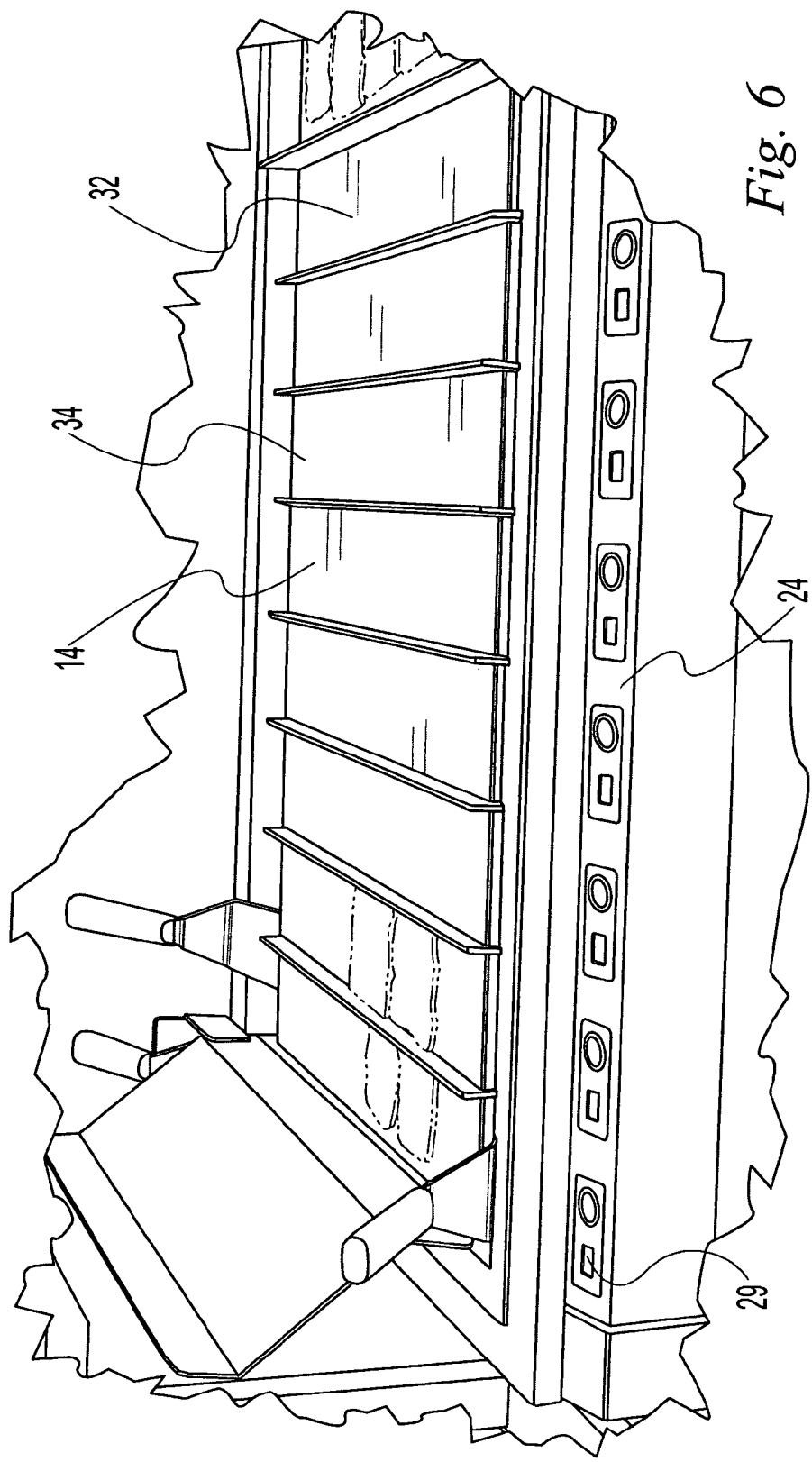
FIG. 6 is a view in rear perspective of the staging area illustrated in FIG. 5.

FIGS. 1 and 2 illustrate a grill 10 which is divided into a cooking area 12 and a staging area 14. Each area has a lower platen below or within which electric heaters are mounted for heating the platen cooking surfaces, although other types of heaters can be used. The cooking area 12 also has three upper platens 16, 18 and 20 which provide double sided cooking because they are pivotally mounted so they can be manually pivoted about their rear edge to a raised position for placing raw food products on the lower platen, or for removing them after they are cooked and can be pivoted to their lowered position for cooking. Electric or other heaters are contained within the upper platens for heating their bottom cooking surfaces.

A front edge panel 22, having an angled surface 23, runs along and encloses the entire front edge of the grill 10 and a similar rear edge panel 24, having an angled surface 25, encloses the rear edge of the staging area 14. Several switches and displays, which are described in more detail below, are spaced along and mounted to the angled surfaces 23 and 25. Although the switches and displays may be mounted along only the front edge, mounting them on both edges enhances operator accessibility to the staging area switches and displays from either side of the grill when the grill is used in an island configuration.

A switch 28 and a display 30 are illustrated in more detail in FIG. 4 and are preferably mounted together in associated pairs. As shown in FIG. 4, each display-switch pair has one input confirmation switch 28 which preferably makes contact and closes a circuit when actuated by an operator and is biased to open when released in order to provide an input signal to a microcontroller computer system. These input confirmation switches may desirably be near proximity switches which respond in a like manner when an operator's finger is near the switch. Each pair also has a user interface display 30, which preferably is a graphical, backlit display having a 36×24 pixel display screen, most preferably a liquid crystal display (LCD), and is connected to an output from the microcontroller computer system. The displays provide visual operation signals, such as the status of a subdivision of the grill's heated surface or the need to perform a manual operation at such a subdivision. The input confirmation switches permit the operator to provide an input signal that confirms that a signaled manual operation has been completed.

Referring to FIGS. 1–3 and 5 and 6, there are a plurality of replications of the switch-display pairs mounted to the front and rear edge panels 22 and 24. Importantly, the switch-display pairs are each mounted in close physical association to a subdivision of the heated grill surface and therefore in close physical association to manual operations which are performed by an operator on the food product workpieces located upon the grill.

In the preferred embodiment, the lower cooking area 12 is subdivided into three cooking sections each corresponding to, and coming into interfacing registration with, one of the three upper platens 16, 18 and 20. Each cooking section is preferably wide enough to permit two rows of side by side food products to be aligned perpendicularly to the front and rear edge panels 22 and 24. Each cooking section is preferably separated from the other cooking sections by removable dividers 31 which are located between and beside the upper platens 16, 18 and 20 so the dividers are not contacted by an upper cooking platen when in its lowered, cooking position. Preferably, each lower cooking section has three electric heaters, a front, center and rear heater, each heater having an associated temperature sensor, such as K-type thermocouples, for a total of nine lower cooking heaters and associated temperature sensors.

The upper cooking platens 16, 18 and 20 are preferably similarly each provided with a front, center and rear heater, for heating the lower cooking surface of each platen. Each heater has an associated temperature sensor, such as K-type thermocouples, for a total of nine upper heaters and associated temperature sensors.

In the preferred embodiment, the staging area 14 is subdivided into two staging sections and each staging section is further subdivided into four staging lanes, such as staging lanes 32 and 34, to provide a total of eight staging lanes. The staging lanes are separated by lane dividers, such as lane dividers 36 and 38, which are removable to facilitate cleaning. The lane dividers are spaced a little wider than the width of a food product 40 so that food products can by aligned along rows within the lanes which are perpendicular to the front and rear edge panels 22 and 24. Preferably, each staging section has an electric heater and an associated temperature sensor, such as those used in the cooking area, for a total of two staging section heaters and associated temperature sensors. This allows the temperature of each staging section to be separately controlled.

From the above it can be seen that the invention involves the separation of the heated surfaces of the cooking appliance into a plurality of zones. A zone can be a single lane, be subdivided into multiple lanes or be wider than a lane but not be subdivided into lanes. A zone can have multiple heaters and temperature sensors associated with the zone, a zone can share the heaters and temperature sensors with one or more other zones and a zone can have its own single heater and single temperature sensor. Thus, it is not necessary, that there be a direct correlation between a zone and the heating and temperature sensing devices which serve the zone.

In the preferred embodiment, each of the three cooking sections forms a zone and each of the eight lanes of the staging area forms a zone. Associated with each zone is a confirmation switch-display pair which is physically located at the end of the zone and preferably both ends of the staging area zones. More specifically, the three cooking zones have three switch-display pairs, collectively 25, each pair physically located at the end of its associated one of the three cooking sections. For the staging area, there are eight switch-display pairs, collectively 27, mounted along the front edge cover 22 and eight switch-display pairs, collectively 29, mounted along the rear edge cover 24, each pair physically located at an end of a staging lane.

Consequently, each display is capable of displaying indicia signaling the state of an individual zone and is also capable of signaling an operation to be performed at the zone. Because of the physical association of the confirmation switch-display pairs with each zone, the operator can readily see both the operation to be performed and the zone at which it is to be performed. The operator does not need to read a display at one location and then find a second location at which the operator is to perform a manual operation. Similarly, after an operation is performed, the operator can signal the completion of the operation by momentarily actuating the confirmation switch which is physically associated with both the zone at which the operation is performed and the display which signaled the needed operation. Consequently, human errors are avoided that would result from reading a single conventional computer display and then moving to find the zone at which an operation is to be performed and in doing so performing the operation at the wrong zone. Similarly, human errors are avoided that would result from going from the zone at which an operation was performed to find a remotely located switch and in doing so actuating the wrong switch One or more of the upper platens 16, 18 and 20 can be provided with a gap adjustment mechanism for raising and lowering the platen to a selected height above the platen of the lower cooking section. For example, a height of 0.225 inches is appropriate for 2 oz. hamburger patties and 0.325 inches is appropriate for 4 oz patties. For this purpose, a manually operated, mechanical, gap adjustment mechanism 57 is mounted to each platen in order to raise and lower the platen between two heights above the lower platen, one appropriate for cooking 2 oz. hamburger patties and the other for cooking 4 oz. hamburger patties. Alternatively, the gap adjustment mechanism 57 can be a mechanical actuator, such as a solenoid, mounted to the appliance to automatically raise and lower the platen to the desired height under control of the microcontroller and its software.

Although not visible in FIGS. 1–6, a displacement sensor is mounted in association with each of the upper platens 16, 18 and 20 to detect whether the platen is pivoted to its raised, open position or its lowered, cooking position. This displacement sensor is used by the microcontroller for such things as the initiation of a cooking timing cycle and the latching of the upper platen in its lower position when the upper platen is detected to be lowered to its lowered cooking position and the premature raising of the platen to stop the two sided cooking process.

Although not illustrated, each upper platen has a counterbalance system, for example using a spring, to exert a torque upon the platen to oppose the torque exerted by gravity. Desirably, the counterbalance torque exceeds the gravitational torque when the upper platen is in its lowered position. A latch mechanism is also provided so that, when the upper platen is manually lowered by an operator grasping the handle 59, the control system actuates the latch when the lowered position is detected by its displacement sensor. The control system releases the latch when the cooking time interval has elapsed and the torque exerted by the counterbalance automatically raises the platen. The latch is also provided with a manual override mechanism which allows the upper platen to be manually raised by exertion of a sufficient upward force by an operator.

The Control System

Some physical manipulation operations upon the food workpieces can be performed most efficiently and cost effectively by a human operator. The purpose of the control system is to control the entire cooking and staging operations, including both the states and operations of the cooking appliance itself and the manual manipulations of the food workpieces performed by an operator.

Figure 7:
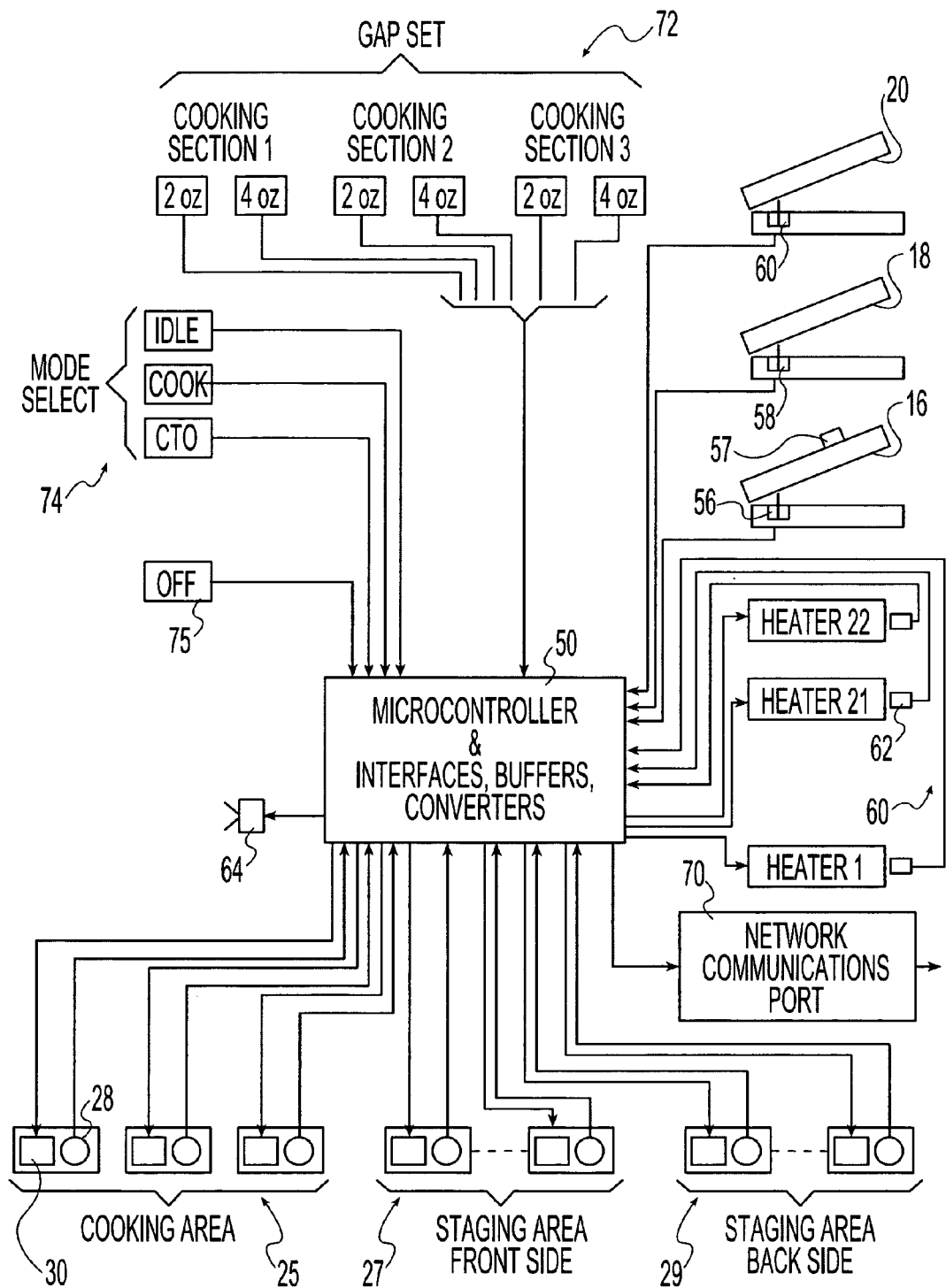
FIG. 7 is a block diagram of the control system of the preferred embodiment of the invention.

FIG. 7 is a block diagram illustrating the fundamental concepts of the preferred cooking appliance embodying the invention. The appliance is controlled by a computer system 50 which receives inputs of control data, data indicating appliance status, and data signaling the performance of manual operations. The computer 50 also outputs signals for controlling the appliance and for signaling. Because the invention does not lie within the computer system itself or the software which controls it, and because prior art computer technology can be applied to practice the invention, the details of the computer system are not illustrated. It is a microcontroller based system which can include the conventional RAM and ROM memory, disk drives, a CPU, logic circuits, interfaces, buffers, drivers, converters and the like and has input and output ports. Of course, neither the input ports nor the output ports need to be physically different from each other if an addressing system is used to permit communication with individual components over a common connection or bus.

The manual input confirmation switches, for each of the three cooking area switch-display pairs 25, for each of the eight, front side, staging area switch-display pairs 27 and for each of the eight, back side, staging area switch-display pairs 29, are connected to input ports of the computer system 50 to input their actuated or unactuated state. Similarly, the user interface displays, for each of the three cooking area switch-display pairs 25, each of the eight, front side, staging area switch-display pairs 27 and each of the eight, back side, staging area switch-display pairs 29, are connected to output ports of the computer system 50 for control of their displayed indicia.

The twenty electric heaters, collectively 60, are connected to output ports of the computer system and each has an associated temperature sensor 62, each of which is connected to a computer input port. As described above, one of the displacement sensors 56, 58 and 60 is mounted in association with each of the upper platens 16, 18 and 20 to detect whether the platen is in its raised or lowered position. Each of these displacement sensors 56, 58 and 60 is connected to an input port of the computer system 50.

An audible alarm signal, under control of the computer system, is provided in order to attract the attention of an operator who is engaged in another task and not viewing the displays. The audible alarm signals the need to perform a manual operation, such as transferring food workpieces which have been cooked to a staging lane, turning such food workpieces after they have been in a staging lane for a selected time interval or removing such food workpieces after they have been in a staging lane for a longer selected time interval. The audible alarms are illustrated as a speaker 64. Preferably, a single such speaker is centrally located where its audible signal can be heard from both sides of the grill. However, two such speakers can be used for signaling for both sides. The alarm signal may include a variety of different signals for signaling different events and may be synthesized by the computer or other conventional audible alarm systems may be used under the control of the computer system.

The computer system 50 advantageously is also provided with a network communications port 70, preferably a wireless interface, to allow the computer system to be connected in a local area network. This allows a manager, in an office remote from the appliance, to input data, receive data reports, and control any aspect of the computer controlled operations of the cooking appliance from a personal computer. Additionally, the communications port 70 and its connection to a LAN, allows similar communication with the computer system 50 from locations which are remote from the restaurant, such as communication with a company headquarters over the internet.

Gap set input switches 72 are mounted in the upper platens and linked to the gap adjustment mechanism 57 by which the gap between each upper platen and its lower cooking section surface is selected for cooking a 2 oz or a 4 oz hamburger patty. The six illustrated switches represent one switch for each of the three cooking sections for selecting the gap for a 2 oz patty and one switch for each of the three cooking sections for selecting the gap for a 4 oz patty. Each gap adjustment switch is actuated when the operator positions the gap adjustment mechanism to select and provide the desired gap so that an input signal is transferred to the computer system 50, to signal whether the lift mechanism is positioned at its 2 oz or 4 oz position. Alternatively, only one pair of gap input switches is needed if only one of the cooking sections is provided with a gap adjustment. A single switch which toggles between 2 oz and 4 oz states may alternatively be used.

The control system of the preferred embodiment also has additional manual inputs for controlling operation of the cooking appliance. These are mode select switches 74 which are mounted to a control panel and accessible to operators from the front of the grill. These mode select switches are preferably IO light emitting diode (LED) displays. They permit the operator to select IDLE, for turning off the entire grill to an inactive state, COOK for turning on the entire grill for normal active use, and CTO for turning on a "cook to order" mode of operation in which only one or fewer than all cooking sections are heated and no staging area heaters are energized. This latter mode is appropriate when the customer ordering rate is low.

The control system of the preferred embodiment also has OFF switch 75 for an emergency stopping operation that places the grill in a safe mode in the event of an emergency situation.

Figure 8A:
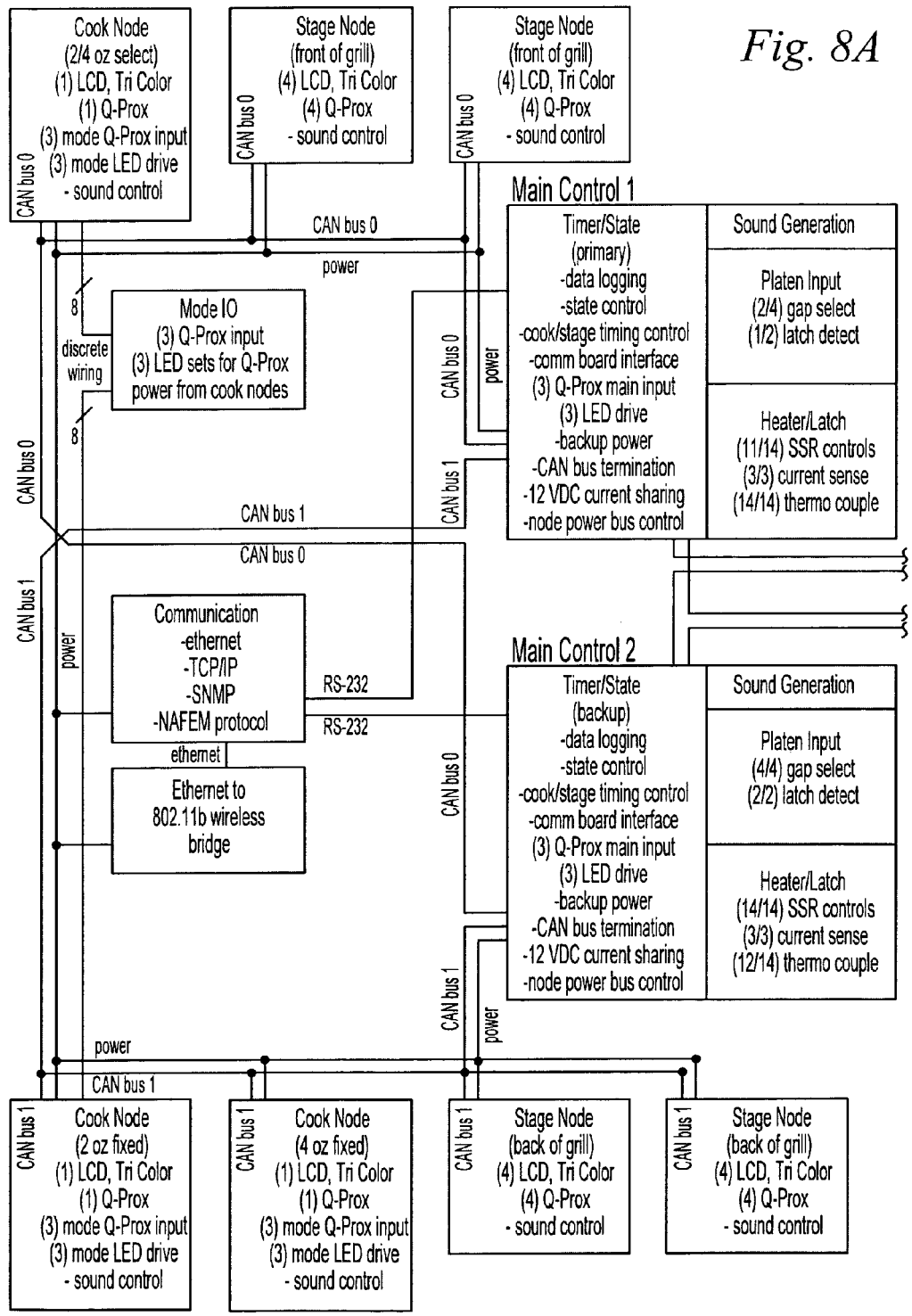
FIG. 8 is a block diagram of the preferred control system showing additional details not shown in FIG. 7.
Figure 8B:
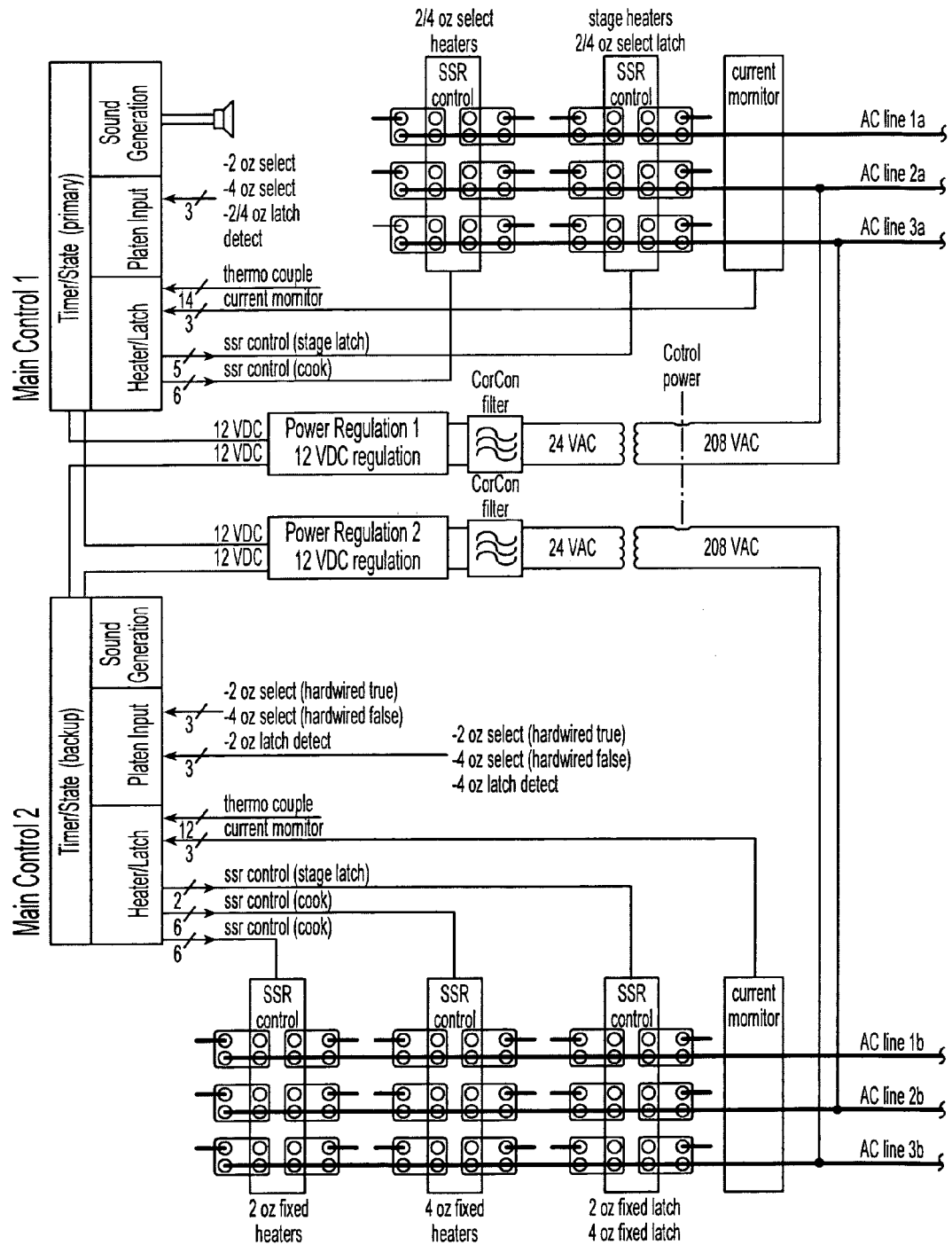

FIG. 8 illustrates some details including some components which are a part of the preferred embodiment but not a part of the invention. These include heater power regulators and heater current monitors used for system diagnostics.

The temperature control of the heaters may be implemented in software in accordance with feedback control algorithms which are well known to those skilled in the art for maintaining the heater temperature at a set point temperature. Although a variety of software implementations for practicing the invention will be apparent from the description, the following describes the main control software operation of the preferred embodiment.

There will be 6 overall grill modes of operation. These are "idle", "prompt on", "cook 0", "cook 1", "auto off", and "fault". On initial control system power on or reset, the grill will be in the "idle" mode.

1. Idle Mode. The grill's control system will be powered and functional, but will present the appearance of the grill being turned off. All cook lane and stage lane LCD's will display "idle" text, with no backlighting. The "idle" Mode IO LED's will be lit. The "cook" and "cook to order" Mode Inputs will be accepted. No other inputs will be accepted or acknowledged. No sound will be generated.

Holding the "cook" input for 1 second will move the grill to the "Cook 0" mode. Holding the "cook to order" input for 1 second will move the grill to the "Cook 1" mode.

2. Prompt On Mode. This is an optional mode which can be enabled via the wireless interface. It will only be allowed when there is a functional wireless connection to the grill.

In "Prompt On" mode, the grill will prompt the user to press either the "cook" or "cook to order" Mode inputs by flashing the LED's associated with the desired input. The "idle" Mode IO LED's will remain lit during the prompt.

Initial prompting will include mild tones of limited duration, spaced one minute apart. If this prompt is ignored for a selected number of minutes, a more urgent prompt tone will be generated for a solid duration of 1 minute. If the prompt is still ignored, the prompt on will be abandoned and the grill will return to "idle" mode.

The prompt on start time will be relative to the store open time. The prompt time before the store open will be configured via the wireless interface.

During the prompts, all grill LCD's will continue to display "idle", with no backlighting. If the prompted Mode Input is pressed, the grill will display a count down to the store open time.

The count down display will have all grill LCD's show a count down in minutes and seconds to the store open time, with backlighting of a selected color. The "idle" Mode IO LED's will be dark, and the selected cook mode LED's will continue to flash.

During the count down, appropriate cook and stage lanes will be preheating for the first store opening of the day. Lane inputs will be acknowledged with a beep tone and flash of the lane's LCD backlight. No action will be taken on lane input.

During the count down, holding the "cook" Mode Input for 1 second will immediately move the grill to the "cook 0" mode. Holding the "cook to order" Mode Input for 1 second will immediately move the grill to the "cook 1" mode.

3. Cook 0 (Standard Cook) Mode. The "Cook 0" mode performs the basic product cook operation, with transfer to the stage area. Temperatures and timing information are taken from predefined product recipes. Two cook lane gap select settings are available—2 oz and 4 oz.

Details of Cook 0 operation are split into separate sections for cook lanes and stage lanes.

3.1. Cook Lanes. Cook lanes will have the possible states described below.

3.1.1. Preheat State. The "Cook 0" mode starts by heating the cook lane to the recipe specified temperatures. While preheating, the lane LCD's will display a universal no graphic, with red backlighting. Lane input press will be acknowledged, but no action will be taken during the preheat. Lane input press and hold will prompt for platen close and standby state entry. Gap select changes will be allowed during preheat. Attempting to start a cook cycle (platen close without standby prompt) will generate an audible alarm and platen open LCD display.

3.1.2. Normal State. Once the specified temperatures have been reached, the lane will move to a normal state. The LCD will display a graphic indicating the gap select setting, with green backlighting. Lane input press will be acknowledged but no action taken. Lane input hold will prompt for platen close and standby state entry. Gap select changes will be allowed in the normal state. Closing the platen while in the normal state (without a standby prompt) will start a cook cycle.

3.1.3. Standby State. Pressing and holding the lane input for 1 second while in the preheat or idle states will prompt the user to close the platen. Once the platen is closed, the lane will be in a standby state. The lane will continue with the preheat or idle LCD display, but with the platen closed instead of open. Coming from preheat, red backlighting will continue. Coming from normal, backlighting will change from green to amber. Lane input press will be acknowledged, with no action taken. Lane input hold will be ignored. Gap select changes will be allowed. Opening the platen during standby state will return to the preheat or normal state.

3.1.4. Cook State. The cook cycle begins with a platen close while in the normal state. The LCD will display an incrementing horizontal bar graph showing cook cycle percent done. Amber backlighting will be used. Lane input press will be acknowledged, with no action taken. Lane input hold will be ignored.

A change in gap select or a platen open during a cook cycle will cause an error. The error condition will include an audible alarm and an LCD display prompting corrective action. The operator will be given 4 seconds to correct such an error before the cook cycle is terminated and the product must be discarded. Cook cycle timing will be suspended during these error conditions.

The cook cycle completes when the recipe specified time has elapsed. After normal cook cycle completion, a 4 second audible alert will sound, and the platen will open automatically. If the platen does not open, a louder repeating audible alarm will be generated until platen open is detected.

3.1.5. Transfer State. Following cook cycle completion and platen open, the lane will move to a transfer state. Stage timing will begin immediately on cook cycle completion (even though not displayed), and will elapse at double time until product is transferred from the cook lane.

While in the transfer state, the LCD will display an unload graphic (including product selection), with rapidly flashing amber backlight. Lane input press will be acknowledged, with no action taken. Lane input hold will be ignored. Gap select changes will be ignored during the transfer state. Platen close will cause an error, including an audible alarm and platen open display on the LCD.

The cook lane will return to the normal state from the transfer state based on input from the stage lane confirmation inputs (confirmation of transfer of product to two stage lanes, or clearing of stage lanes expecting transfer).

3.1.6. Stage State. If, on entry to the transfer state, two available stage lanes are not available, temporary product staging will occur in the cook lane. The LCD will display a count up timer of elapsed stage time (stage time elapses at double rate while in cook lane), with amber backlight. If a single stage lane is available, the backlight will alternate amber/red to indicate the dual transfer/stage state of the cook lane. Cook lane input press will be acknowledged, but no action taken. Lane input hold will be ignored. Gap select changes will be ignored while in the stage state. Platen close will cause an error, including an audible alarm and platen open display on the LCD.

If the cook lane contains the next product to use for a given product type, the backlight will change to green or alternating green/red (if dual transfer/stage state). While the cook lane contains the next product to use, a lane input press will be accepted to clear the lane and return it to the normal state.

If a stage lane becomes available while a cook lane is in the stage state, the cook lane will move back to the transfer state. If multiple cook lanes are in the stage state, stage lanes will be assigned to the cook lanes based on which cook lane started staging first.

If the stage timer expires for a cook lane, the LCD will display the universal no symbol with slow red flashing backlight and a repeating audible alarm. Lane input press will be acknowledged, but no action taken. Lane input hold will clear the lane and return it to the normal state.

3.2. Stage Lanes. Stage lanes will have the possible states described below.

3.2.1. Preheat State. The "Cook 0" mode starts by heating the stage areas to the recipe specified temperatures. While preheating, the lane LCD's will display a universal no graphic, with red backlighting. Lane input press will be acknowledged, but no action will be taken during the preheat. Lane input press and hold will be ignored during preheat.

3.2.2. Normal State. Once the specified temperatures have been reached, the lane will move to a normal state. The LCD will display an "empty" graphic, with no backlighting. Lane input press will be acknowledged but no action taken. Lane input hold will be ignored.

3.2.3. Transfer State. At the end of a cook cycle, the two stage lanes closest to the edge of the grill will be selected to accept the product transfer from the cook lane. The LCD will display the product size (2 oz, 4 oz), with flashing amber/red backlight. Lane input press will confirm the product transfer, and moves the lane to the stage state. Elapsed stage time will be received from the associated cook lane when this confirmation occurs. Lane input hold (1 second) will clear the lane and return it to the normal state. When both lanes are either confirmed or cleared, the associated cook lane will be moved from the transfer state back to the normal state.

3.2.4. Stage State. The LCD will display a decreasing, vertical bar graph indicating stage time remaining. Backlight color will be green if the lane contains the next product to be used for sandwich making, full amber if the lane is second next, and dim amber for general staging. Lane input press will clear the lane and return it to the Normal state. Lane input hold will be ignored.

If the stage time expires before the lane is cleared, the LCD will display a universal no graphic with slow red flashing backlight. A repeating audible alert will also be generated. Lane input press will be acknowledged, but no action taken. Lane input hold will clear the lane and return it to the Normal state.

4. Cook 1 (Cook to Order) Mode. Cook 1, Cook to Order Mode is essentially the Cook 0, Standard Cook Mode, without the use of stage lanes.

4.1. Cook Lanes. In Cook to Order Mode, the cook lanes will follow the operation of the Cook 0, Standard Cook Mode. The only difference is that following completion of a cook cycle, the lane will skip the transfer state and go directly to the stage state.

4.2. Stage Lanes. In Cook to Order Mode, the stage lane LCD's will display "off", with no backlighting. Lane input press will be ignored. Lane input hold will be ignored. The stage area heaters will be turned off. This operation for the stage lanes will be the same as in the full grill Idle Mode.

5. Auto Off Mode. This is an optional mode which can be enabled via the wireless interface.

The "Auto Off" mode will automatically move the grill to the "Idle" mode after store close time. "Auto Off" mode will only be entered after the store close time, and after a delay of a selected number of minutes after the last lane timing operation has completed.

When "Auto Off" mode is entered, a count down to off is started. The count down time will be configured via the wireless interface. This count down will be displayed on all lane LCD's in a minutes:seconds format. A selected backlighting color will be used. The Mode IO LED's for the current cook mode will remain lit. The off Mode IO LED's will flash. An audible alert will sound once a minute during the count down. When the count down expires, the grill will automatically move to the "Idle" mode.

Holding any of the Mode IO inputs for 1 second will move the grill to the associated mode of operation. Holding any of the lane inputs for 1 second will return the grill to the previous cook mode.

6. Fault Mode. The "Fault" mode will be entered on a lane by lane basis. Various conditions could arise that would prevent the safe preparation of product. These conditions will result in the "Fault" mode. Any number of lanes could independently enter the "Fault" mode. Some conditions will cause multiple or all lanes to enter the "Fault" mode.

When a lane is in the "Fault" mode, it will display appropriate indicia on the LCD, with red backlighting. Lane input will not be accepted or acknowledged in "Fault" mode. Platen open/close will be allowed in "Fault" mode.

When the overall grill mode is "Idle", individual lanes will remain in the "Idle" mode and not enter the "Fault" mode. As soon as the overall grill mode changes from "Idle", individual lanes with fault conditions will enter the "Fault"

mode. Mode IO inputs and LED's will function based on the overall grill mode, regardless of single, multiple, or all lanes being in the "Fault" mode.

Operation

The control system controls cooking attributes and equipment attributes and is responsive to the state of the cooking attributes and departures of cooking attributes from the desired, preprogrammed attributes. The cooking attributes include: (1) timing, including cooking time, total holding time in at least one and preferably multiple staging zones and turning time in each staging zone; and (2) temperature of lower grill zones, temperature of each upper grill platen, and temperature of the staging area zones. The equipment attributes include: (1) physical spacing between the upper and lower cooking platens to accommodate different size work products (e.g. 2 oz and 4 oz hamburger patties); and (2) the state of the upper cooking platens, either raised or lowered. The control system actuates the displays to signal the status of a currently ongoing food heating operation, and to signal the operator to initiate a physical manipulation of a food work products when the attributes and timing sequences are in a selected state appropriate for performing the operation.

Prior to commencing cooking operations the control system must be initialized by storing the control parameters including the set point temperatures and the timing intervals. For example, the upper platen temperatures are set at 380° F., the lower platen cooking temperature set at 250° F., and the staging temperature set at 215° F. For stored timing intervals: cook time for 4-oz. meat is 85 seconds, cook time for 2-oz. meat is 40 seconds, staging time for 4-oz. meat is 12 minutes, and staging time for 2-oz. meat is 10 minutes. In the event that optional timing and signaling of the turning of meat in the staging area is used, turn meat time for both 2-oz and 4-oz. meat may be at the first minute then every two minutes. For the purpose of signaling a premature interruption of cooking time by the raising of an upper platen additional time intervals may be stored. A cooking interruption time interval may be stored for allowing an upper platen to be opened for up to that time interval, such as 3 seconds. It should be apparent, however, that different timing and temperature parameters may be stored for different food products and variations from the above parameters may be made, when preferred, for hamburger patties.

Figure 9:
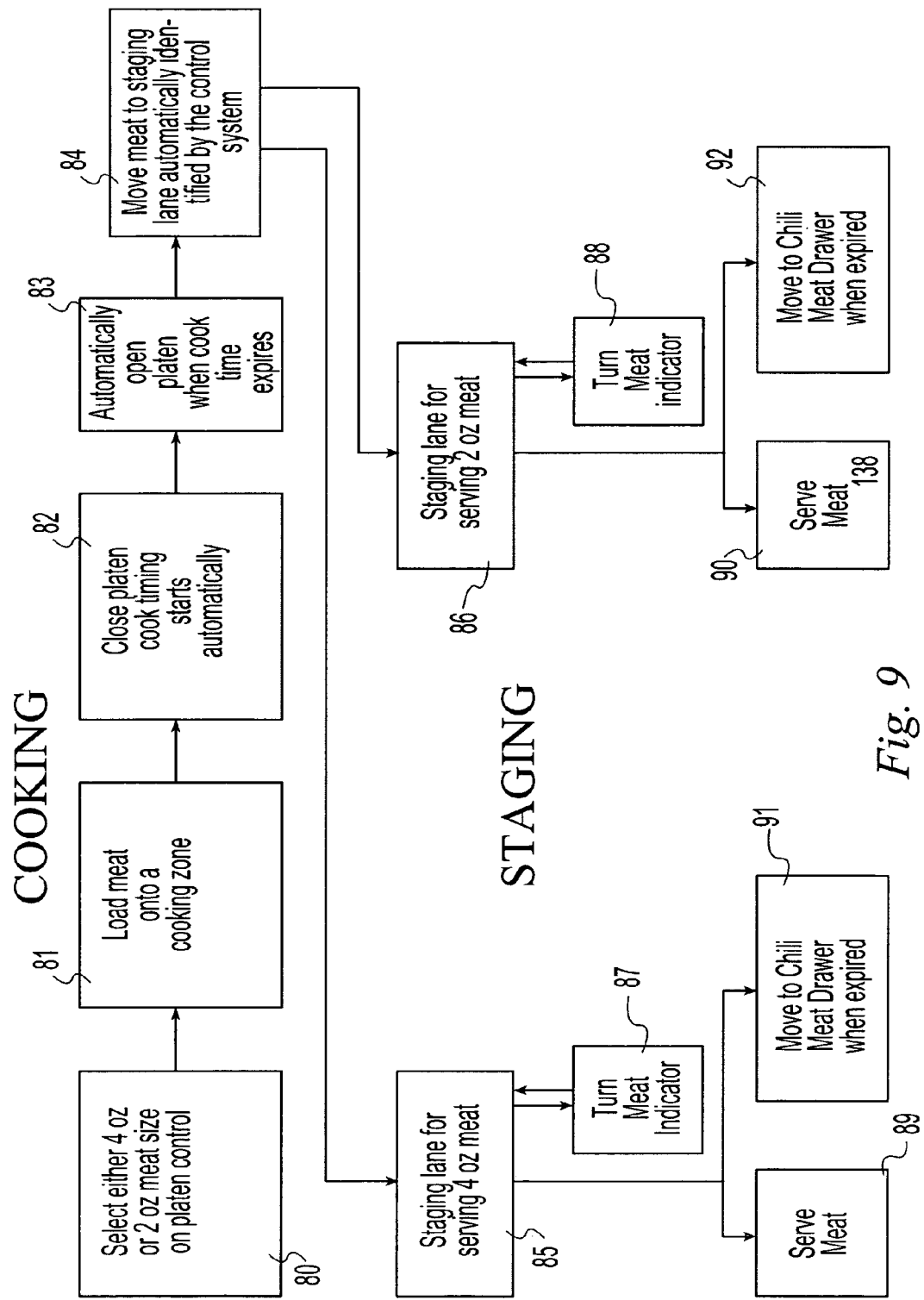
FIG. 9 is a flow chart illustrating the operation of the preferred embodiment of the invention.

Operation of the preferred embodiment is described with reference to the flow chart of steps in FIG. 9 and the tables of display indicia in FIGS. 10 and 11. The operation of the grill begins with actuation of the COOK switch of the mode switches 74 (FIG. 7). A warm up sequence is then initiated to bring the heated platens to the stored temperatures. The display associated with each cooking zone displays the indicia 100 before its associated cooking platens reach the stored cooking temperature and is backlighted in red. In the event that an upper platen is lowered before cooking temperature is reached, indicia 116 is displayed to signal that the platen should be raised.

The platen height adjustment is set (80) for the appropriate meat, 2-oz. or 4-oz. When the cooking platen of a zone reaches the stored cooking temperature, the associated display switches to a green back light, indicating correct temperature, height adjustment setting is confirmed by displaying either "2-oz." or "4-oz." indicia 102 or 104, depending upon which height adjustment has been made.

Meat of the appropriate size is laid (81) in the cooking zone under an upper cooking platen. All associated temperatures must be ready and, if they are, that is indicated with a green back light condition. The cooking platen is lowered (82), giving a start cooking signal to the timing system resulting from actuation of a displacement sensor 56, 58 or 60 (FIG. 7). The display associated with the loaded cooking zone changes to an amber back light and an animated timer bar graph is shown as indicia 106 or 108. This timing cycle can not be terminated once the platen is closed. Attempting to start a cook cycle by lowering a platen with temperature NOT ready indicia 100 (red back light), will sound an audible alarm and timing will not begin.

During idle periods, the upper cooking platens can be stored in a closed position to conserve energy, regardless of temperature, by holding the platen input confirmation switch until the platen is closed completely. While holding the switch, the display will show "Close For Standby" and alternate amber/green or amber/red depending upon temperature. In this closed position, the timer will not start, but the display will indicate temperature by displaying color and meat size as normal. "Powering on" the grill system with a platen closed will automatically place each lowered cooking platen in this state. Opening the platen resets the system to its normal state.

In order to deter use of inadequately cooked meat, if an upper platen is raised before the completion of a cook cycle, an audible alarm sounds and the cooking time count down will stop during the open condition. If the upper platen is lowered within 3 seconds, the alarm will be automatically cancelled and the cooking timing will resume. If a platen is raised for more that 3 consecutive seconds, no staging time is initiated and the need to divert the food workpiece may be signaled and any meat should be manually cooked for chili. The associated display will display the indicia 118 and this alarm is canceled by holding the confirmation switch for 5 seconds which resets the timer to a "ready" state. The associated display then displays indicia 120.

When the cook cycle completes normally, the latch is unlatched and the platen is automatically lifted to its open position by the counterbalance system as described above. In the event that the upper platen fails to be lifted, for example because of an equipment failure, a repeating audible signal having a relatively urgent tone is given until the upper cooking platen is raised. When the cook cycle completes, the associated display shows the "open" indicia 110 signaling that the upper platen should be raised. Upon raising (83) of the upper platen, the associated display flashes an amber back light rapidly and displays the "unload" indicia 112 or 114 along with the appropriate meat size. In addition to canceling any audible signal, raising the platen initiates the appropriate staging lane indicators.

Upon completion of a cooking cycle, the control system selects the two empty staging lanes which are closest to the human operator designated as the sandwich maker and identifies these lanes by displaying on their associated displays a flashing amber back light and either "2-oz." or "4-oz." indicia 130 or 132 as appropriate. The operator then manually transfers (84) the meat to those staging lanes. After completing the manual transfer of all the meat from the cooking zone to the staging lane, the operator presses the input confirmation switch, which is associated with the staging lane to which the meat was transferred, one time to confirm that the meat was transferred and is located at the staging lane (85 or 86). The display associated with each lane to which meat was transferred, then shows staging time remaining, either with a bar graph indicia or decimal digits as in displays 134 or 136, with a continuous amber or green back light as appropriate. The staging count down time begins immediately upon the expiration of the cook time, but is not displayed until confirmation that the meat has been transferred from the cooking lanes to the staging lanes.

In the event that the second staging lane is not required due to a reduced size cooking load, the second lane can be cleared by pressing and holding the confirmation switch associated with that second staging lane for at least one second. The lane display returns to "empty" indicia 138 and no back light is shown. From the above steps, the computer control system is able to maintain a record of which lanes or zones have food products and which do not and the state of the food products in those lanes.

Upon confirming or clearing both initiated staging lanes, the display for the associated cooking lane clears the "unload" indicia 112 or 114 and the system performs the following evaluation which signals to the operator the lanes from which meat should be taken for serving customers (89 or 90). The oldest lane of 2-oz. and the oldest lane of 4-oz. will be identified as the serving lane by a green back light on the appropriate staging lane display along with time remaining as shown as indicia 134 and 136. The second oldest lane of 2-oz. and the second oldest lane of 4-oz. will be identified as the serving lane by a amber back light on the appropriate staging lane display along with time remaining as shown as indicia 142 and 144. All remaining active staging lane displays will display time remaining with a dim amber back light and the indicia 146 and 148. The age of a staging lane is determined first by the time the cook cycle was completed and then by which lane was confirmed first. If all the meat from a given lane is served before the staging time expires, the lane must be cleared and made available by pressing and holding the lane's input confirmation switch for at least 1 second. At that point the cleared lane's display returns to "empty" with no back light and the next oldest lane of the same size meat will have its display back light change to green.

Although not used in the preferred embodiment, the control system can also signal and control a periodic turning of food products in the staging lanes if that is desired. In that event, associated with each staging lane and at a programmed interval into the staging cycle, a "turn meat" symbol 140 will appear (87 or 88) on the lane's display, the current back light color will flash slowly and there will be an audible signal. This will continue until cancelled by pressing the associated lane input confirmation switch one time. Count down of time remaining is not interrupted although the time is not actually displayed during this "turn meat" operation.

When the staging count down time expires, the universal no symbol 150 is displayed with a red slow flashing back light on the associated lane display along with a repeating audible signal. The expired meat is removed (91 or 92) by the operator from the lane and placed in chili meat storage, the lane is cleared by pressing and holding the lane's input confirmation switch for at least one second which returns the lane indicator to "empty" 138.

There are additions and enhancements which can also be provided in embodiments of the invention. The presence of a food work product on the grill, particularly in the staging area, may be detected by use of light (e.g. visible or IR) sources radiating an array of beams or a scanning beam across and above the grill surface and incident upon suitable light detectors. Multiple lamps may be used and may be modulated with signal codes and/or multiplexed. The light detectors can provide data to the computer control system for detecting the presence of a food workpiece in a lane or zone.

As another enhancement, because cooking equipment is controlled by the control system, a cooking zone can used as an overflow staging area, for high volume restaurants. This is automatically initiated when the capacity of the standard staging area is exceeded. The control system counts each second of time that a food workpiece sets upon the cooking area as two seconds of time on the staging area and then uses staging area indicia and inputs from the user confirmation switches that are described above in connection with the staging area. Thus the total time allowed for staging is reduced when a cooking section is used for staging, but the food workpieces can be transferred to the staging area when available where the staging time continues at the usual rate.

The principles of the invention may be applied beyond grills and cooking hamburger patties. They can be applied to other cooking appliances, such as fried chicken fryers and chicken holding drawers, in which there are multiple heating zones with associated manual manipulations of the food workpieces.

While certain preferred embodiments of the present invention have been disclosed in detail, it is to be understood that various modifications may be adopted without departing from the spirit of the invention or scope of the following claims.

The invention claimed is:

1. A control system connected to and for controlling a cooking appliance having a plurality of heated zones, the control system comprising:
   a. a microcontroller computer system under control of a program controlling cooking times and generating signals for indicating the need for manual operations by an operator;
   b. a plurality of sensors including temperature sensors detecting a temperature of each zone, each sensor connected to input a signal to the computer system;
   c. a plurality of displays each connected to receive output signals from the computer system, each display being mounted in physical association with a zone for signaling a zone condition and signaling manual operations needed for its associated zone; and
   d. a plurality of manual input switches each connected to input a signal to the computer system, each manual input switch being mounted in physical association to a zone for manual confirmation of performance of a manual operation signaled by a display for its associated zone.

2. A control system in accordance with claim 1, wherein the microcontroller also controls cooking temperatures.

3. A control system in accordance with claim 2, wherein at least some of said displays and input switches are arranged in physically associated pairs, each pair having a display and a switch, the pairs being physically located at diverse locations on the grill in proximity to the location of the performance of the manual operations they signal.

4. A control system in accordance with claim 3 and further comprising an audible alarm connected to receive output signals from the computer system for signaling to an operator the need to perform a manual operation.

5. A control system connected to and for controlling a grill, the grill including a cooking area and a staging area, the cooking area having at least one lower cooking zone and at least one upper cooking platen movable into and away from a position spaced above the lower cooking zone, the staging area having at least one staging zone, the control system comprising:
   a. a microcontroller computer system under control of a program controlling cooking and staging times, zone and platen temperatures and generating signals for indicating the need for manual operations by an operator;

b. a plurality of sensors including temperature sensors detecting the temperature of each zone and platen, each sensor connected to input a signal to the computer system;

c. a plurality of user interface displays each connected to receive output signals from the computer system, each display being mounted in physical association to a different one of said zones for signaling a zone condition and manual operations needed for its associated zone; and d. a plurality of manual input confirmation switches each connected to input a signal to the computer system, each manual input switch being mounted in physical association to a different one of said zones for manual confirmation of performance of a manual operation signaled by a display for its associated zone.

6. A control system in accordance with claim 5, wherein at least some of said displays and input switches are arranged in physically associated pairs, each pair having a display and a switch, the pairs being physically located at diverse locations on the grill in proximity to the location of the performance of the manual operations they signal and confirm.

7. A control system in accordance with claim 6 wherein the zones comprise parallel lanes oriented substantially parallel to a front edge of the grill, each zone having at least one of said physically associated pairs.

8. A control system in accordance with claim 7, wherein the cooking area comprises a plurality of cooking zones, each cooking zone comprises two of said lanes and has an upper platen movable to a position above its two lanes, each cooking zone having one of said physically associated pairs.

9. A control system in accordance with claim 8, wherein the staging area comprises a plurality of staging zones, each staging zone comprising a lane and having one of said physically associated pairs.

10. A control system in accordance with claim 7, wherein at least some of said pairs are located on physically opposite sides of said grill.

11. A control system in accordance with claim 5 and further comprising a position sensor linked to the upper platen for detecting whether the platen is in a raised or lowered position, the position sensor having an output connected to an input to the computer system for inputting platen position data to the computer system for signaling initiation of a cooking operation.

12. A control system in accordance with claim 5 or 6 or 7 or 8 or 9 or 10 or 11 and further comprising:

a. an input for entering a size of a food product to be cooked on the grill into the computer system; and b. a lift mechanism mechanically linked to at least one upper platen for adjusting the height of the platen above the cooking area.

13. A control system in accordance with claim 12 wherein the lift mechanism is an electrically controlled mechanical actuator having an input connected to an output of the computer system for control of the upper platen height above the lower cooking zone.

14. A control system in accordance with claim 12 and further comprising a temperature sensor associated with each zone for detecting the temperature of its associated zone, each temperature sensor connected to the computer system for controlling the temperature of each zone and preventing initiation of a cooking timing cycle for a zone when the zone temperature is outside a temperature range stored in the computer system.

15. A control system in accordance with claim 5 or 6 or 7 or 8 or 9 or 10 or 11 and further comprising a temperature sensor associated with each zone for detecting the temperature of its associated zone, each temperature sensor connected to the computer system for controlling the temperature of each zone and for preventing initiation of a cooking timing cycle for a zone when the zone temperature is outside a temperature range stored in the computer system.

16. A method for controlling manual operations associated with a cooking appliance having a plurality of heated zones for heating a food workpiece, the method comprising:

c. storing a time interval, associated with each zone, for performing a workpiece heating operation at the associated zone after which a manual workpiece operation needs to be performed;

d. detecting the commencement of a heating operation at a zone on the food workpiece and initiating a timing cycle for a zone when and at which the heating operation commences;

e. visually signaling the elapse of the stored time interval associated with each zone at a display which is physically associated with the zone; and f. manually inputting a confirmation signal from a manually operable switch physically associated with a zone when the manual workpiece operation for that zone has been performed.

17. A method in accordance with claim 16 wherein the commencement of the heating operation in a cooking zone is detected by detecting the lowering of an upper platen down upon workpieces positioned in a cooking zone.

18. A method in accordance with claim 16 wherein the commencement of a heating operation is detected by manually inputting a signal from a manually operable switch physically associated with a zone at which a heating operation has commenced.

19. A method in accordance with claim 16 wherein the heated zones include cooking zones in which the heating operation includes cooking food workpieces and staging zones in which the heating operation includes holding food workpieces within a stored temperature range, wherein the commencement of a cooking operation in a cooking zone is detected by detecting the lowering of an upper platen down upon workpieces positioned in a cooking zone, wherein the commencement of a holding operation in a staging zone is detected by manually inputting a signal from a manually operable switch physically associated with a staging zone at which a holding operation has commenced, and wherein the method further comprises storing an acceptable cooking temperature range, detecting the temperature of a cooking zone and disabling the initiation of a timing cycle for a cooking zone whenever the temperature of the cooking zone is not within the stored cooking temperature range.

20. A method in accordance with claim 19, wherein the method further comprises:

a. storing in the computer system a removal time interval after which a food workpiece in a staging zone should be removed from the staging zone;

b. visually signaling a staging zone, in which cooked food workpieces should be placed, at a display which is physically associated with the zone;

c. manually inputting in the computer system a confirmation signal from a manually operable switch physically associated with the staging zone that food workpieces have been placed in the staging zone and initiating in the computer system a holding timing cycle in response to the confirmation signal;

d. upon elapse of the stored removal time interval for a staging zone, visually signaling, at a display which is physically associated with the staging zone, that food workpieces in the staging zone should be removed from the cooking appliance; and e. manually inputting in the computer system a confirmation signal from a manually operable switch physically associated with a staging zone that food workpieces have been removed from the staging zone.

21. A method in accordance with claim 20 and further comprising storing in the computer system a turning time interval after which a food workpiece in the staging zone should be turned, initiating in the computer system a turning timing cycle in response to the confirmation signal that food workpieces have been placed in the staging zone, and upon elapse of the stored turning time interval for a zone, visually signaling, at a display which is physically associated with the zone, that food workpieces in the staging zone should be turned.

22. A method in accordance with claim 16 or 17 or 18 or 19 or 20 or 21 and further comprising actuating an audible alarm in association with visual signaling.

* * * * *